United States Patent Office 2,891,093
Patented June 16, 1959

2,891,093

NEUTRAL DIESTERS OF 2,2'-[ISOPROPYLIDENE-BIS(p-PHENYLENEOXY)]-DIETHANOL

Everett C. Hurdis, Clifton, and John F. Petras, Glen Rock, N.J., assignors to United States Rubber Company, New York, N.Y., a corporation of New Jersey No Drawing. Application January 28, 1957
Serial No. 636,499

3 Claims. (Cl. 260—485)

The invention comprises new compositions of matter, namely, the neutral diesters of 2,2'-[isopropylidenebis(p-phenyleneoxy)]diethanol, represented by the general formula

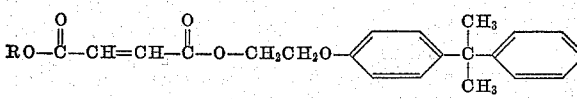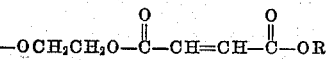

where R is either the methyl or ethyl radical.

These new compounds are copolymerizable monomers and (like the unsaturated polyesters described in the Carleton Ellis U.S. Patent No. 2,195,362, dated March 26, 1940, and U.S. Patent No. 2,255,313, dated September 9, 1941) they can be copolymerized in combination with various reactive (copolymerizable) ethylenic monomers, such as vinyltoluene, vinyl acetate, 2-methyl-5-vinylpyridine, methyl methacrylate, diallyl phthalate, triallyl cyanurate, N-vinylphthalimide, diallyl benzenephosphonate, etc., to give new and useful plastics. However, in contradistinction to the conventional unsaturated polyesters covered by the above mentioned Ellis patents, the new monomers of this invention have a number of important advantages. Specifically, when copolymerized with styrene in mixtures containing 30–70% styrene, the following properties result in comparison with conventional unsaturated polyester-styrene mixtures:

(1) Higher heat distortion temperature.
(2) Greater chemical resistance.
(3) Greater resistance to discoloration on exposure to light.

These advantages of the new copolymerizable monomers of this invention are the result of several important differences in chemical makeup as compared with conventional copolymerizable unsaturated polyesters:

(1) The new monomers of this invention are prepared from substantially two mols of unsaturated dicarboxylic acid dialkyl ester or of monomethyl dicarboxylate monochloride per mol of the dihydroxy compound, resulting in definite chemical compounds of relatively low molecular weight. The conventional unsaturated copolymerizable polyesters, i.e., those covered by the above mentioned Ellis patents, in contrast are prepared by reacting substantially only one mol of unsaturated dicarboxylic acid with one mol of the dihydroxy compound, so that there results a mixture of chemical species with a broad molecular weight distribution and relatively high molecular weight.

(2) The new monomers of this invention are so prepared that the unsaturation in the compounds occurs in definite, known positions at the ends of the molecular chains, rather than dispersed at random throughout the molecules as in the case of conventional copolymerizable unsaturated polyesters. Localization of the unsaturation at the chain ends in this way usually results in superior physical properties in copolymers because of the high degree of structural regularity thus obtained.

(3) Conventional unsaturated polyesters have units held together by ester linkages entirely. The new copolymerizable monomers of this invention contain a considerable proportion of chemically stable phenyl ether linkages with resulting advantages in resistance to chemicals, heat and light.

The following examples are given to illustrate the invention, parts being by weight.

EXAMPLE 1

This example demonstrates preparation of the neutral diester of 2,2'-[isopropylidenebis(p-phenyleneoxy)]diethanol with methyl hydrogen fumarate, by an ester interchange reaction, with the use of 30% excess dimethylfumarate, magnesium catalyst and no solvent.

A one-liter reaction flask was charged with:

|  | G. |
|---|---|
| 2,2'-[isopropylidenebis(p-phenyleneoxy)]diethanol, M.P. 108–113° C., 0.667 mol | 211 |
| Dimethyl fumarate, 1.87 mol | 269 |
| Magnesium turnings | 3 |
| Hydroquinone | 0.25 |

The mixture was heated with mechanical stirring under a nitrogen atmosphere at such a rate that the maximum pot temperature of 230° C. was attained in 1½ to 2 hours. The methanol vapor evolved was condensed and removed from the system.

The excess, unreacted dimethyl fumarate was then removed by vacuum distillation at 0.1 mm. gauge pressure up to a maximum pot temperature of 180° C. The product thus prepared was cooled to 100° C. and an additional amount of hydroquinone (0.01%) added to insure storage stability.

The preparation, when carried out in this way, resulted in substantially complete reaction to form the neutral diester of 2,2'-[isopropylidenebis(p-phenyleneoxy)]diethanol with methyl hydrogen fumarate. The formula is represented as follows:

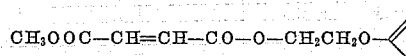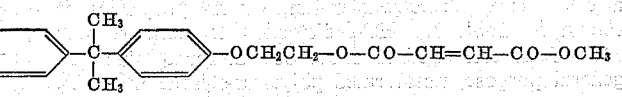

Completeness of the reaction is proved by obtaining nearly the theoretical amount of methanol evolved (38 g. out of a theoretical 43 g.) and also by the saponification number, which dropped from an initial 436 for the unreacted mixture to 147. Calculated saponification number for the neutral diester is 135. The product was obtained in the form of a hard, glassy solid at room temperature.

The monomer as obtained above was copolymerized with styrene in a composition containing 40% by weight styrene and 4% of benzoyl peroxide paste (1:1 benzoyl peroxide and tricresyl phosphate). The product was a hard transparent plastic. As indicated in Table I, exceptionally high heat distortion temperature was obtained, while other properties were comparable to or better than a conventional general purpose unsaturated polyester styrene copolymer.

The 2,2'-[isopropylidenebis(p-phenyleneoxy)]diethanol may be prepared from ethylene chlorohydrin and 4,4'-isopropylidenediphenol ("Bisphenol A"). However, it is most economically prepared by the reaction of ethylene oxide with Bisphenol A. Methods for carrying out this addition reaction are well known in the art and are not the subject of this patent. The Bisphenol A-ethylene oxide adduct may also be obtained commercially in a crude form as "Dow Experimental Resin X-1277."

EXAMPLE 2

This example demonstrates the preparation of the methyl fumarate diester by the use of a 400% excess of dimethyl fumarate, tetrabutyl titanate as catalyst and benzene as solvent.

A reaction flask of one liter capacity, equipped with mechanical stirrer, fractionating column, distillation head, pot thermometer, and vapor thermometer was charged with 360 g. (2.5 mols) of dimethyl fumarate, M.P. 102° C.–103° C. and 350 ml. of benzent. The mixture was refluxed until the small amount of water in the dimethyl fumarate was removed azeotropically. 2,2'-[isopropylidenebis(p-phenyleneoxy)]diethanol, 79 g. (0.25 mol), was then added and the mixture again refluxed, water being removed azeotropically until the vapor temperature held constant at 80° C. A solution of 3 ml. of tetrabutyl titanate in 30 ml. of benzene was added, and the mixture was distilled at such a rate that the pot temperature rose gradually from 96° C. to 165° C. over the course of 3 hours. Distillate was removed at vapor temperature varying between 67° C. and 77° C. When the pot temperature reached 165° C. the temperature was held constant until methanol evolution ceased. Analysis of the condensate indicated that nearly the theoretical amount of methanol had been distilled out.

After completion of the reaction, the titanium ester catalyst was destroyed by adding 10 ml. of water and 400 ml. of benzene and heating with stirring for ½ hour at 70° C.–80° C. On cooling, most of the excess dimethyl fumarate precipitated out and was removed by filtration. Solvent and the remaining unreacted dimethyl fumarate were then removed by distillation, first under atmospheric pressure, and finally under vacuum at 0.1 mm.

The product of this reaction solidified, on cooling, to a crystalline solid of melting range 69° C.–79° C. Recrystallization from 57% acetic acid gave white crystals melting at 93° C.–97° C. Analysis showed that a pure neutral diester had been formed: saponification equivalent, calculated 135, observed 134; cryoscopic molecular weight in benzene solution, calculated 540, observed 531.

By copolymerizing with an equal weight of styrene, a clear hard plastic was obtained with properties as shown in Table I. Heat distortion temperature was 118° C. as compared to about 80° C. for commercial, general purpose, unsaturated polyester-styrene mixtures.

EXAMPLE 3

This example demonstrates a method of preparation of the methyl hydrogen fumarate diester where only a 10% excess of dimethyl fumarate is used. It also shows the use of acetyl peroxide instead of benzoyl peroxide for the copolymerization with styrene.

The charge consisted of 2,2'-[isopropylidene-bis(p-phenlyeneoxy)]diethanol, 316 g. (1 mol.); dimethyl fumarate, 317 g. (2.2 mols); and 200 ml. of benzene. After removal of water azeotropically, 3 ml. of tetrabutyl titanate catalyst was added and the ester interchange carried out, with gradual takeoff of benzene and methanol and with gradual rise in pot temperature to 153° C. The total reaction time was 3 hours. Titanate ester was then decomposed by water addition. Solvent and unreacted dimethyl fumarate were removed by vacuum distillation.

On cooling, the product solidified to a light yellow crystalline mass. The following analytical data show that the expected neutral diester was obtained in spite of the relatively low excess of dimethyl fumarate used:

|  | Calculated | Observed |
|---|---|---|
| Saponification equivalent | 135 | 139 |
| Molecular weight | 540 | 572 |
| Acid number | 0 | 1 |
| Hydroxyl number | 0 | 6 |

Without further purification, the monomer prepared as above was copolymerized with styrene, using acetyl peroxide catalyst. Hard, transparent, light yellow castings were obtained with physical properties as listed in Table I. The observed heat distortion temperature, 110° C., while not as high as obtained in Examples 1 and 2, was still a considerable improvement on general purpose commercial polyester-styrene mixtures which give heat distortion temperatures of about 80° C.

EXAMPLE 4

This example demonstrates the preparation of the methyl hydrogen fumarate diester by reaction of 2,2'-[isopropylidenebis(p-phenylenoxy)]diethanol with the acid chloride of methyl hydrogen fumarate, i.e., with trans-beta-carbomethoxyacrylyl chloride.

2,2'-[isopropylidenebis(p-phenyleneoxy)]diethanol, 340 g. (1.07 mols), was heated with a solution of 297 g. of the acid chloride of methyl hydrogen fumarate (2.0 mols). Hydrogen chloride evolution began when a temperature of 70° C. was reached. The temperature was held between 70° C. and 80° C. until gas evolution slowed. Benzene was then gradually distilled off until the mixture reached 165° C. On cooling, the crude product was obtained as an extremely viscous liquid. This was recrystallized from isopropyl alcohol. Yield was 490 g. (90.7%) of white, crystalline material melting at 67° C.–77° C.

That the expected neutral diester had actually been made in this reaction was demonstrated by analysis:

|  | Calculated | Observed |
|---|---|---|
| Saponification equivalent | 135 | 139 |
| Molecular weight (in benzene) | 540 | 543 |
| Acid number | 0 | 2 |
| Hydroxyl number | 0 | 5 |

The monomer prepared as above was dissolved in an equal weight of styrene and was copolymerized by benzoyl peroxide catalyst, using an oven cure. A clear, hard plastic resulted with physical properties as noted in Table I. In every respect, properties compared favorably with those obtained from material prepared by ester-interchange (as in Examples 1, 2 and 3). In particular, the high heat distortion temperature shown by ester-interchange prepared material was also observed in the copolymer of the material prepared starting with the half-ester half-chloride.

The preparation of trans-beta-carbomethoxyacrylyl chloride is well known in the art. The method of Eisner, Elvidge, and Linstead (published in the Journal of the Chemical Society of London, 1951, page 1502) gives good yields of pure material.

Table I

PROPERTIES OF COPOLYMERS OF STYRENE WITH METHYL HYDROGEN FUMARATE DIESTERS

| Diester of Example | 1 | 2 | 3 | 4 |
|---|---|---|---|---|
| Composition: | | | | |
| Monomer, parts by weight | 60 | 50 | 50 | 50 |
| Styrene, parts by weight | 40 | 50 | 50 | 50 |
| 50% Benzoyl peroxide paste (parts by weight) | 4 | 4 | | 4 |
| Acetyl peroxide, 25% solution (parts by weight) | | | 2 | |
| Cured 15 hours at 55° C. plus 1 hour at 110° C. | | | | |
| Physical Properties: | | | | |
| Rockwell R. hardness | 127 | 127 | 126 | 126 |
| Tensile strength, p.s.i. | 4,600 | [1] n.d. | n.d. | 5,910 |
| Elongation at break, percent | 10 | n.d. | n.d. | 15 |
| Young's modulus, p.s.i. $\times 10^{-3}$ at— | | | | |
| 25° C. | 510 | 450 | 500 | 430 |
| 50° C. | 430 | 420 | 380 | 400 |
| 75° C. | 340 | 340 | 300 | 350 |
| 100° C. | 240 | 230 | 150 | 280 |
| 125° C. | 110 | 25 | 4.4 | 35 |
| 150° C. | 7.6 | 4.6 | 4.5 | 4.6 |
| Izod notched impact strength, (ft. lb. per inch of notch) | 0.22 | 0.25 | 0.23 | 0.25 |
| Heat distortion temperature, ° C. | 126 | 118 | 110 | 118 |

[1] n.d.=not determined.

NOTE.—Elongations were calculated from jaw separation and are therefore higher than true absolute values. A jaw separation elongation of 8% corresponds to elongation 1.3 to 1.5% by A.S.T.M. test.

EXAMPLE 5

This example demonstrates the preparation of the ethyl hydrogen fumarate diester by an ester interchange reaction, from diethyl fumarate, with tetrabutyl titanate as catalyst.

A reaction flask of one liter capacity was charged with the following:

2,2' - [isopropylidenebis(p - phenyleneoxy)]diethanol, 1 mol _____ g__ 316
Diethyl fumarate, 3 mols _____ g__ 516
Benzene _____ ml__ 400

After removal of the small amount of water in the reactants by azeotropic distillation, 6 ml. of tetrabutyl titanate was added and the mixture was distilled with gradual takeoff of condensate at vapor temperature 74° C. to 79° C. By periodic addition of benzene the rise of pot temperature was slowed so that about 2 hours was required to obtain 100° C. pot temperature. At this point analysis of the condensate indicated that the theoretical amount of ethanol had been evolved, and the reaction was discontinued. The titanium ester was then decomposed by adding 5 ml. water and stirring for 2 hours at 75° C.–80° C. After filtration to remove precipitated titanium dioxide, the solvent and remaining unreacted diethyl fumarate were removed by distillation, first under atmospheric pressure and then under 0.1 mm. vacuum. The product was then cooled to 100° C. and 0.01% of p-tert-butylcatechol added to insure storage stability. On cooling to about 24° C., the product was an extremely viscous liquid, which gradually set to a glassy solid.

The diester made by the above method was copolymerized with various proportions of styrene, ranging from 30% to 50% styrene. On curing these mixtures using benzoyl peroxide catalyst, transparent, hard, useful plastics were obtained. The physical properties of these are as shown in Table II. An advantage over commercial general purpose unsaturated polyester-styrene mixtures was noted, in that heat distortion temperatures ranging from 103° C. to 115° C. were obtained. Other properties were as good as or better than those observed for the commercial, general purpose polyester-styrene mixtures.

Table II

PROPERTIES OF COPOLYMERS OF STYRENE WITH ETHYL FUMARATE DIESTER OF EXAMPLE 5.

| Composition: | | | |
|---|---|---|---|
| Monomer, parts by weight | 70 | 60 | 50 |
| Styrene, parts by weight | 30 | 40 | 50 |
| 50% Benzoyl peroxide paste (parts by weight) | 4 | 4 | 4 |
| Cure: 15 hours at 55° C.+1 hour at 70° C.+1 hour at 90° C.+1 hour at 110° C. | | | |
| Physical Properties: | | | |
| Rockwell R hardness | 126 | 127 | 127 |
| Tensile strength, p.s.i. | 5,050 | 5,010 | 4,730 |
| Elongation at break, percent | 1.3 | 1.7 | 1.9 |
| Young's Modulus, p.s.i.$\times 10^{-3}$ at— | | | |
| 25° C. | 460 | 420 | 420 |
| 50° C. | 360 | 340 | 380 |
| 75° C. | 260 | 260 | 350 |
| 100° C. | 110 | 160 | 230 |
| 125° C. | 14 | 16 | 26 |
| 150° C. | 12 | 6 | 4 |
| Notched Izod Impact Strength, (ft.-lb. per inch notch) | 0.23 | 0.18 | 0.18 |
| Heat Distortion Temperature, ° C. | 103 | 108 | 115 |

Having thus described our invention, what we claim and desire to protect by Letters Patent is:

1. A fumaroid type compound represented by the general formula

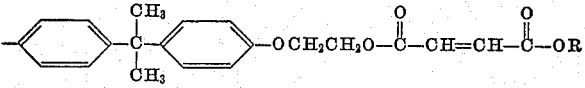

where R is an alkyl group selected from the class consisting of methyl, and ethyl radicals.

2. A fumaroid type compound represented by the general formula

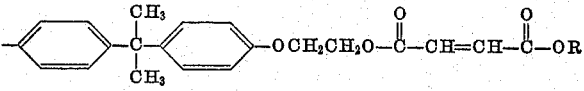

where R in each instance represents —$CH_3$.

3. A fumaroid type compound represented by the general formula

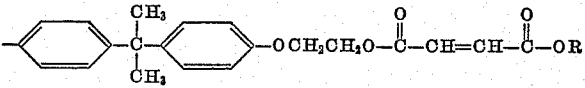

where R in each instance represents —$C_2H_5$.

References Cited in the file of this patent

UNITED STATES PATENTS

| 2,359,622 | Coleman et al. | Oct. 3, 1944 |
| 2,634,251 | Kass | Apr. 7, 1953 |
| 2,652,419 | De Groote | Sept. 15, 1953 |